US012115688B2

(12) United States Patent
Wu

(10) Patent No.: US 12,115,688 B2
(45) Date of Patent: Oct. 15, 2024

(54) TRIMMER HEAD FOR PEN-SHAPED EYEBROW TRIMMER

(71) Applicant: LITTLE STONE CERAMIC BLADE (ZHONGSHAN) COMPANY LTD., Zhong Shan (CN)

(72) Inventor: Rangpan Wu, Zhong Shan (CN)

(73) Assignee: LITTLE STONE CERAMIC BLADE (ZHONGSHAN) COMPANY LTD., Zhong Shan (CN)

( * ) Notice: Subject to any disclaimer, the term of this patent is extended or adjusted under 35 U.S.C. 154(b) by 332 days.

(21) Appl. No.: 17/764,675

(22) PCT Filed: Sep. 18, 2021

(86) PCT No.: PCT/CN2021/119331
§ 371 (c)(1),
(2) Date: Mar. 29, 2022

(87) PCT Pub. No.: WO2022/063081
PCT Pub. Date: Mar. 31, 2022

(65) Prior Publication Data
US 2022/0362955 A1 Nov. 17, 2022

(30) Foreign Application Priority Data
Sep. 28, 2020 (CN) ......................... 202011042060.1

(51) Int. Cl.
*B26B 19/14* (2006.01)
*B26B 19/38* (2006.01)

(52) U.S. Cl.
CPC .......... *B26B 19/14* (2013.01); *B26B 19/3806* (2013.01); *B26B 19/3846* (2013.01)

(58) Field of Classification Search
CPC .. B26B 19/14; B26B 19/3806; B26B 19/3846
(Continued)

(56) References Cited

U.S. PATENT DOCUMENTS 340,212 A * 4/1886 Heath et al. ............ A24F 13/26 30/113
2,127,010 A * 8/1938 Sampson ................ B26B 21/20 30/32
(Continued)

FOREIGN PATENT DOCUMENTS

CN 209036592 U 6/2019
CN 209304623 U 8/2019
(Continued)

OTHER PUBLICATIONS

Nov. 12, 2021 International Search Report issued in International Patent Application No. PCT/CN2021/119331.
(Continued)

*Primary Examiner* — Omar Flores Sanchez
(74) *Attorney, Agent, or Firm* — Oliff PLC

(57) ABSTRACT

A trimmer head for pen-shaped eyebrow trimmer, including a cylindrical trimmer head body, the trimmer head body is provided with a blade, the trimmer head and handle can form an eyebrow trimmer with a pen-shaped structure. The blade is a curved arc-shaped structure, and blade edge at the upper end is arc-shaped; by placing the upper end of blade on upper end face of trimmer head body, the trimmer head can move perpendicular to the skin or inclined at a certain angle with the direction perpendicular to the skin when shaving, combined with the inclined setting of the blade relative to axis L of the trimmer head body to form an inclined cutting angle to ensure sharpness of cutting. To improve the flexibility and controllability of eyebrow trimming, the blade with arc-shaped structure can effectively control the shaving of concave and convex parts, as to accurately trim and shape eyebrows.

19 Claims, 13 Drawing Sheets

(58) Field of Classification Search
USPC .......................... 30/29, 43.91–42, 43.7, 43.8
See application file for complete search history.

(56) References Cited

U.S. PATENT DOCUMENTS

| | | | | | |
|---|---|---|---|---|---|
| 2,308,049 | A * | 1/1943 | Brull | B26B 19/12 | 30/43.8 |
| 4,782,590 | A * | 11/1988 | Pope | B26B 21/4006 | 30/32 |
| 4,845,848 | A * | 7/1989 | Strickland | B26B 21/52 | 30/32 |
| 4,961,262 | A | 10/1990 | Lawrence | | |
| 5,727,318 | A * | 3/1998 | Reiswig | A45D 29/02 | 30/29 |
| 5,908,036 | A * | 6/1999 | Andrews | B26B 21/10 | 132/289 |
| 6,557,259 | B1 * | 5/2003 | Nguyen | A45D 29/02 | 132/75.5 |
| 7,003,882 | B2 * | 2/2006 | Sakai | A45D 29/02 | 30/28 |
| 8,726,520 | B1 * | 5/2014 | Abraham | B26B 21/22 | 30/32 |
| 9,108,329 | B2 * | 8/2015 | Stiles | B26B 21/22 | |
| 10,076,173 | B1 * | 9/2018 | Kaidi | A45D 29/02 | |
| 2009/0119932 | A1 * | 5/2009 | Lau | B26B 19/06 | 30/356 |
| 2023/0339129 | A1 * | 10/2023 | Harris | B26B 19/386 | |

FOREIGN PATENT DOCUMENTS

| | | | |
|---|---|---|---|
| CN | 112318557 | A | 2/2021 |
| CN | 213918370 | U | 8/2021 |
| CN | 213918371 | U | 8/2021 |
| DE | 2851361 | A1 | 6/1980 |
| TW | M528854 | U | 9/2016 |

OTHER PUBLICATIONS

Nov. 12, 2021 Written Opinion issued in International Patent Application No. PCT/CN2021/119331.

* cited by examiner

TRIMMER HEAD FOR PEN-SHAPED EYEBROW TRIMMER

FIELD OF THE INVENTION

The present invention relates to a trimmer head for pen-shaped eyebrow trimmer.

BACKGROUND OF THE INVENTION

At present, there are usually two kinds of tools for shaping eyebrows, one is a rotary electric eyebrow trimmer, and the other is a hand-shaving eyebrow razor.

The hand-shaving eyebrow razor, such as the Taiwan patent of TW M528854U, the blade of the hand-shaving eyebrow razor is usually straight, and usually it can only be scraped down from the top of the eyebrows, there are eyelids below the eyebrows, and the skin surface is uneven, so it is unable to effectively trim eyebrows, which has safety problems. Moreover, the blade is wide and long, which is not easy to shape, and it cannot be made very small, because it is easy to insert into the skin if it is too small, and when using this eyebrow trimmer to trim your own eyebrows, you need to look in the mirror to trim your eyebrows, due to the blocked vision or the blade holding posture, and your hand needs to trim with force, it is difficult to control the scope of shaving, if you cannot control the force of your hand, you will either shave too much or not, or even cut your skin, which is very inconvenient to operate.

The rotary electric eyebrow trimmer, such as application number CN201821817498.0, named as a trimmer head device for eyebrow trimmer, as shown in its technical solution, a first blade and a second blade are sleeved through a trimmer head cover that has a small radius and easy to shape, and a plurality of straight groove-shaped blade slits are disposed on the trimmer head cover along the circumferential direction for the eyebrows to enter, the first blade and the second blade are driven by a rotating shaft to rotate for cutting the eyebrows in the trimmer head cover. Due to the trimmer head cover, and the trimmer head cover has a certain thickness, the shaving is not clean, and the shaving speed is too fast, when you are not careful and the position of the electric eyebrow trimmer is not correct, it is easy to shave off the eyebrows that do not need to be trimmed, so you need to be very careful when shaving.

Since the eyebrows have a certain length and flexibility, the trimmer head cover usually adopts a straight groove structure for entering the hair, and because the straight groove structure is easier for the skin to squeeze into, in order to ensure safety and avoid cutting the skin, the width of the straight groove structure needs to be made smaller, if the width of the straight groove is small, the hair inlet will be small, which will cause difficulty in hair feeding, resulting in extremely poor hair feeding efficiency of the existing rotary electric eyebrow trimmer.

Therefore, an eyebrow trimmer that can shape, trim, and is safe and easy to use is urgently needed by the market and users.

The present invention is based on the above-mentioned situations.

SUMMARY OF THE INVENTION

The technical problem to be solved by the present invention is to provide a trimmer head for pen-shaped eyebrow trimmer, which can form a pen-shaped eyebrow trimmer together with a handle, and has simple structure, can shape and shave hair, it is, safe and easy to use.

In order to realize the above object, the invention adopts the following technical solutions.

A trimmer head for pen-shaped eyebrow trimmer, comprising a cylindrical trimmer head body, the trimmer head body is provided with a blade which can shave body hair from an upper end, the blade is composed of an arc-shaped piece which has an arc-shaped structure in cross-section, and an arc-shaped blade edge is formed at the upper end of the arc-shaped piece, and the blade is disposed obliquely relative to the axis L of the trimmer head body.

In the trimmer head for pen-shaped eyebrow trimmer, the blade edge comprises an arc-shaped main cutting edge at the top, the cutting edge line of the main cutting edge is arc-shaped and perpendicular to the axis L of the trimmer head body or substantially perpendicular to the axis L of the trimmer head body.

In the trimmer head for pen-shaped eyebrow trimmer, the blade comprises a concave surface and a convex surface forming an arc-shaped structure, and an upper end face connecting the concave surface and the convex surface from the upper end, the concave surface and the upper end face are disposed at an acute angle and intersect to form the main cutting edge; the blade is respectively provided with rounded corners between the upper end face and the left and right sides, the angles between the arc surfaces formed by the rounded corners and the concave surface are acute angles, the arc surfaces formed by the rounded corners intersect with the concave surface to form auxiliary cutting edges. Or the blade comprises a concave surface and a convex surface forming an arc-shaped structure, and a V-shaped tip connecting the concave surface and the convex surface from the upper end, the V-shaped tip forms the main cutting edge, and the angle $\beta$ of the V-shaped sharp angle is between 5° and 30°.

In the trimmer head for pen-shaped eyebrow trimmer, the width D corresponding to the width direction of the upper end of the trimmer head body and the blade meets $2\ \text{mm} \leq D \leq 15\ \text{mm}$, the width E of the upper part of the blade meets $2\ \text{mm} < E \leq 10\ \text{mm}$.

In the trimmer head for pen-shaped eyebrow trimmer, the cross-section of the blade is a circular arc structure, and the radius R of the corresponding circle meets $1.5\ \text{mm} \leq R \leq 10\ \text{mm}$.

In the trimmer head for pen-shaped eyebrow trimmer, the inclined angle $\alpha$ between the blade and the axis L of the trimmer head body meets $10° \leq \alpha \leq 80°$.

In the trimmer head for pen-shaped eyebrow trimmer, the blade is disposed in the trimmer head body, the upper end face of the trimmer head body is provided with a blade outlet for the upper end of the blade to extend upward, the trimmer head body is provided therein with a blade rack that can move up and down in it, the blade is fixed on the blade rack and moves upward with the blade rack so that the upper end of the blade extends above the upper end face of the trimmer head body, and retracts below the upper end face of the trimmer head body with the blade rack moving downward.

In the trimmer head for pen-shaped eyebrow trimmer, the lower part of the trimmer head body is provided with a connector that can prevent the blade rack from falling out of the trimmer head body, the blade rack is slidably connected up and down on the connector, and an elastic member which can elastically press the blade rack downward when the blade rack is raised upward is provided between the blade rack and the trimmer head body.

In the trimmer head for pen-shaped eyebrow trimmer, the connector is provided with a connecting part located below the trimmer head body and used for connecting with a handle, the connector is provided with a through-hole that penetrates up and down, the blade rack is provided with a pressing shaft inserted into the through-hole, and the upper end of the blade is extended above the trimmer head body by pressing the pressing shaft upward.

In the trimmer head for pen-shaped eyebrow trimmer, the connector is clamped and fixed on the trimmer head body, the connecting part is a cylindrical structure, the pressing shaft is provided with a convex lug that protrudes downward below the connecting part, the convex lug is disposed away from the central axis of the connecting part, there is a smooth transition between the convex lug and the lower end face of the pressing shaft, and the blade rack is connected to the connector and rotates as the connector rotates.

In the trimmer head for pen-shaped eyebrow trimmer, the outer side of the connecting part is provided with a chute concave from bottom to top, and the outer side of the connecting part is provided with a slot that is concave from the side along its circumferential direction, one end of the slot is communicated with the upper end of the chute, and the slot and the chute form an L-shaped structure, the connecting part is provided with gear bars protruding in the slot along the circumferential direction, there are chamfers between the top and two sides of the gear bars, and the gear bars divide the slot into three gear spaces, one of the gear spaces communicates with the chute.

In the trimmer head for pen-shaped eyebrow trimmer, the elastic member is an elastic arm with one end fixed on the blade rack and the other end suspended, the trimmer head body is provided with a limiting boss located above the elastic member for limiting the upward lifting of the elastic member.

In the trimmer head for pen-shaped eyebrow trimmer, the blade rack is provided with an arc-shaped back part for the blade to abut against, the blade is in a T shape from up to down, and the arc-shaped back part is provided with side wings extending relatively from the left and right sides of tongue bases, and a mounting groove for inserting the T-shaped lower part of the blade is formed between the left and right side wings and the arc-shaped back part, the arc-shaped back part is provided with a clamping boss located below the side wings, and the side of the clamping boss close to the mounting groove is provided with a chamfer for the blade to slide over the clamping boss, the blade is provided with a clamping hole for clamping with the clamping boss, and when the T-shaped upper part of the blade is clamped on the upper ends of the left and right side wings, the clamping hole is clamped on the clamping boss.

In the trimmer head for pen-shaped eyebrow trimmer, the side of the trimmer head body corresponding to the concave surface of the blade is provided with at least a hair discharge port for the hair falling into the trimmer head body to fall out.

In the trimmer head for pen-shaped eyebrow trimmer, the blade rack is provided with a hair discharge inclined plane inclined to the hair discharge port from top to bottom, the upper end of the hair discharge inclined plane is located below the edge of the blade, and the lower end is located above the bottom end of the hair discharge port.

In the trimmer head for pen-shaped eyebrow trimmer, the upper end face of the trimmer head body forms a blade outlet, and a side wall corresponding to the convex surface of the blade is an arc structure corresponding to the convex surface of the blade.

In the trimmer head for pen-shaped eyebrow trimmer, the side of the trimmer head body corresponding to the concave surface of the blade is provided with comb teeth.

In the trimmer head for pen-shaped eyebrow trimmer, the distance C between the comb teeth facing the blade and the blade is between 0.2 mm and 3.0 mm.

In the trimmer head for pen-shaped eyebrow trimmer, the height B of the blade retracting below the upper end face of the trimmer head body meets $0<B\leq 0.3$ mm.

In the trimmer head for pen-shaped eyebrow trimmer, the height A of the blade extending above the upper end face of the trimmer head body meets $0<A\leq 0.5$ mm.

In the trimmer head for pen-shaped eyebrow trimmer, the concave surface of the blade is disposed obliquely downward.

Compared with the prior art, the present invention has the following advantages:

1. The blade of the present invention has a curved arc structure, and the upper end of the blade edge corresponds to an arc, therefore, on the premise of ensuring safety, compared with the existing straight eyebrow trimming blade, the blade can be made very small and not easily inserted into the skin; combined with the inclined setting of the blade relative to the axis L of the trimmer head body, the trimmer head can form a pen-shaped eyebrow trimmer together with a handle, so that the eyebrow trimming can be operated like a pen. By placing the upper end of the blade on the upper end face of the trimmer head body, the trimmer head can move perpendicular to the skin or inclined at a certain angle with the direction perpendicular to the skin when shaving, and the cutting edge direction of the blade is inclined to the axis of the trimmer head to form an inclined cutting angle to ensure the sharpness of cutting. Holding the pen-shaped eyebrow trimmer like a pen can effectively cut off the eyebrows, improve the flexibility and controllability of eyebrow trimming, and facilitate the control of the movement, direction and shaving amount of the eyebrow trimming, the blade with arc-shaped structure can effectively control the shaving of concave and convex parts, so as to accurately trim and shape eyebrows, and the cutting edge of arc-shaped structure enables the trimmer head to cut from multiple directions, when holding the eyebrow trimmer without angular rotation, shaving in different directions can be realized only by controlling the shaving direction of the trimmer head through fingers. Moreover, for individuals who trim their own eyebrows, looking in the mirror and holding the pen-shaped eyebrow trimmer to obtain a better vision and flexibly use to effectively trim their eyebrows, which has the advantages of convenient operation and high shaving safety.

2. The blade of the present invention can extend or retract from the trimmer head body through the blade outlet. When it is not in use, the blade is hidden under the upper end face of the trimmer head body, which plays a protective role, and no additional pen cap is required for protection. When it needs to be used, the upper end of the blade is raised above the upper end face of the trimmer head body by the driving switch device, and the blade is fixed for effective shaving, which has the advantages of simple structure and convenient use, and can avoid the defect that the blade cannot be protected due to the loss of the cap.

3. The elastic member of the present invention can prevent the blade from extending from the blade outlet autonomously, and can cooperate with the lifting device to fix the blade rack after the lifting device lifts the blade rack, which is elastically limited from the top by the elastic member, since the force on the black rack is downward during shaving, the lifting device supports the blade rack from below to ensure the stability of the blade rack, it only needs to set the height at which the lifting device lifts the blade rack, the structure is simple and reduces the matching accuracy between the blade rack and the trimmer head body required to define the position when the blade rack is raised.

4. The present invention uses three gear spaces to cooperate with the buckle provided on the handle, and one of the gear spaces is communicated with the chute, so that when the trimmer head is installed on the handle, the chute and the buckle are matched for the connecting part to be inserted into the assembly groove, the buckle slides directly into the gear space, and the trimmer head is rotated so that the buckle slides over the gear bar and is in a gear space in the middle, then the trimmer head is installed and fixed on the handle, and the position between the lifting boss and the convex lug is staggered at this time; when the eyebrows need to be trimmed, the trimmer head is rotated so that the buckle slides over another gear bar and is in the third gear space, the position between the lifting boss and the convex lug is opposite up and down, and during the rotation process, the convex lug is pushed up by the lifting boss so that the upper end of the blade extends above the trimmer head body. When the trimmer head is rotated in the opposite direction, the blade is retracted into the trimmer head body, and the trimmer head can be removed from the handle when the trimmer head is rotated continuously. The disassembly structure is simple, and the blade lifting is convenient.

5. In the present invention, the comb teeth are disposed on the side of the trimmer head body corresponding to the concave surface of the blade, so as to facilitate hair guiding, and at the same time, the comb teeth are facing the blade, which can also play the role of orientation indication, during eyebrow trimming, since the blade is hidden between the skin and the trimmer head body, the direction of the blade can be known through the comb teeth, which can effectively trim.

6. The blade edge of the present invention comprises an arc-shaped main cutting edge at the top, the cutting edge line of the main cutting edge is arc-shaped and perpendicular to the axis L of the trimmer head body or substantially perpendicular to the axis L of the trimmer head body. During shaving, when the trimmer head moves perpendicular to the skin or moves substantially perpendicular to the skin, the arc-shaped cutting edge of the main cutting edge is substantially close to the skin; or when the trimmer head is inclined at a certain angle perpendicular to the direction of the skin for shaving, the arc-shaped cutting edge of the main cutting edge can also be attached to the skin in the middle, the two ends will only be raised by a small height and can also touch the skin according to the floating of the skin when shaving, so as to avoid injuring the skin with only a small tip of the main cutting edge touching the skin.

DESCRIPTION OF DRAWINGS

The specific embodiments of the present invention will be described in further detail below in conjunction with the accompanying drawings, in which.

DETAILED DESCRIPTION OF THE INVENTION

The present invention will be described in further detail below in conjunction with the accompanying drawings:

As shown in FIG. 1 to 9, and FIGS. 11 to 15, a trimmer head 10 for pen-shaped eyebrow trimmer, comprising a cylindrical trimmer head body 1, the trimmer head body 1 is small at the top and big at the bottom, the trimmer head body 1 is provided with a blade 2 which can shave body hair from an upper end, the blade 2 is composed of an arc-shaped piece which has an arc-shaped structure in cross-section and an arc-shaped blade edge is formed at the upper end of the arc-shaped piece, and the blade 2 is disposed obliquely relative to the axis L of the trimmer head body 1.

Figure 1:
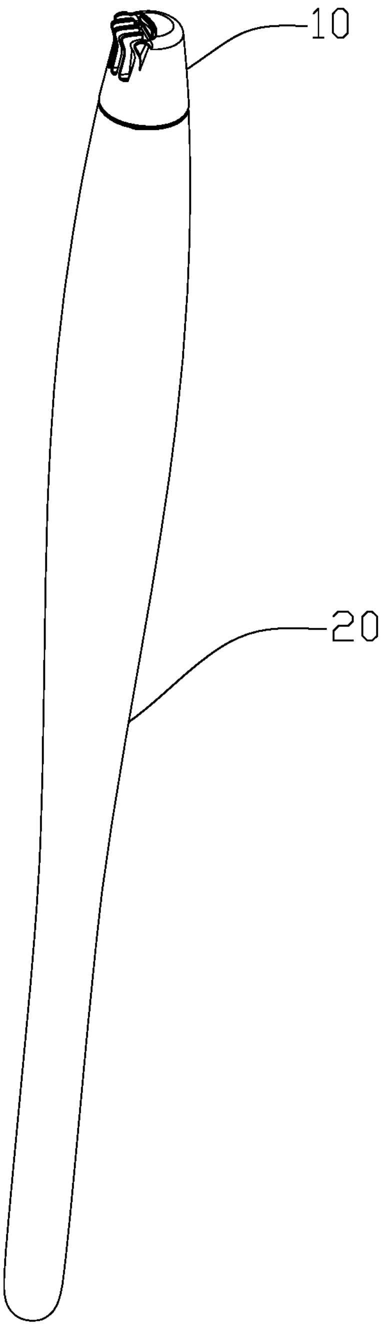
FIG. 1 is a structure diagram showing the structure of a pen-shaped eyebrow trimmer.
Figure 2:
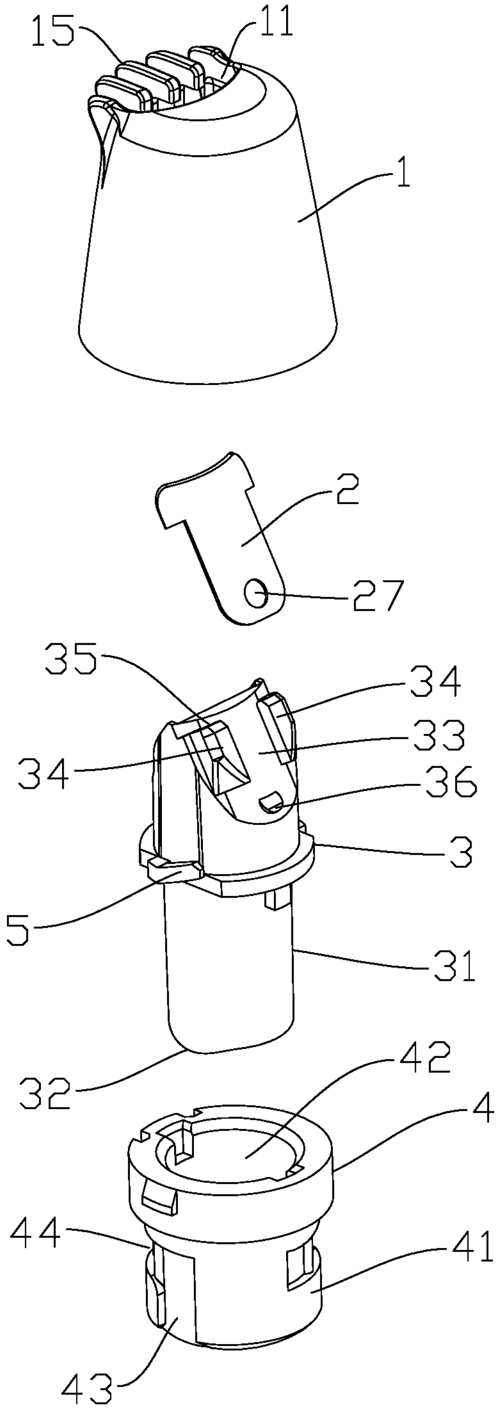
FIG. 2 is an exploded view of an embodiment of a trimmer head for pen-shaped eyebrow trimmer of the present invention.
Figure 3:
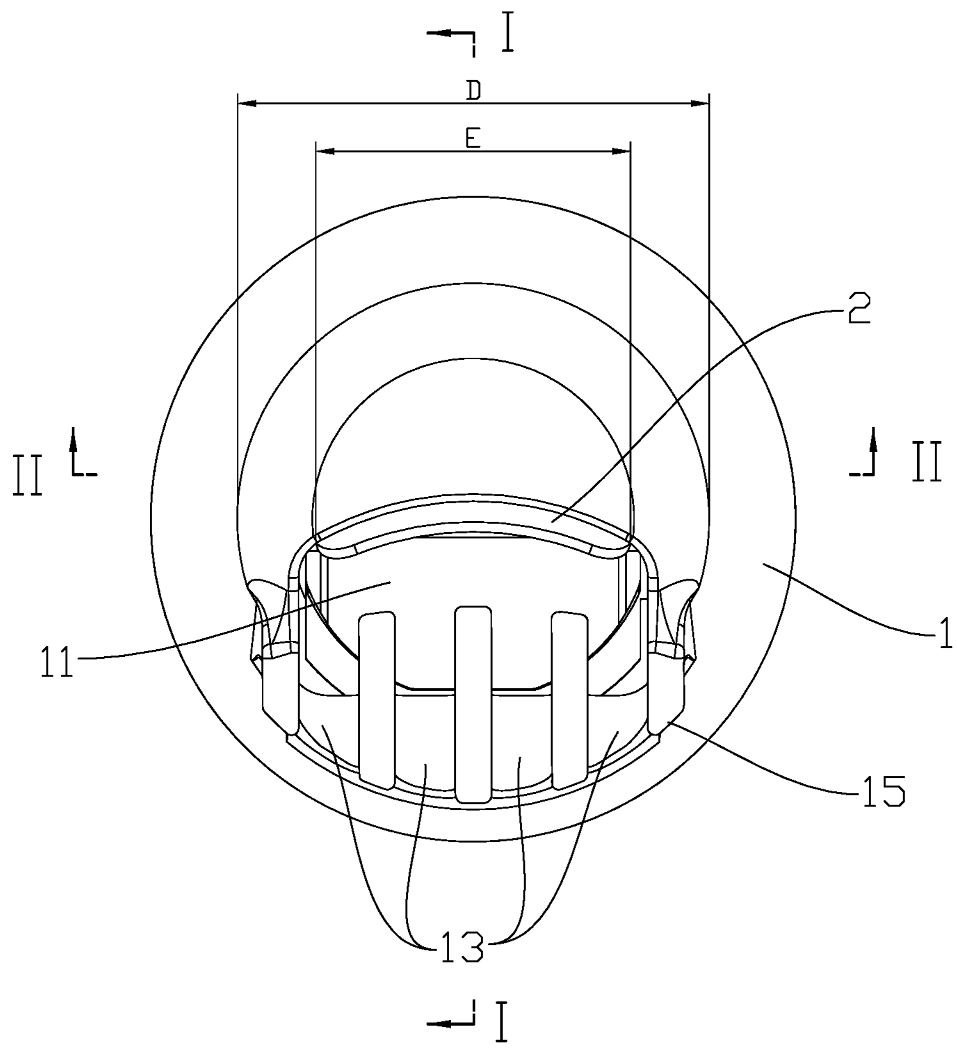
FIG. 3 is a top view of a trimmer head for pen-shaped eyebrow trimmer of the present invention.

As shown in FIG. 1, the trimmer head 10 and the handle 20 can form an eyebrow trimmer with a pen-shaped structure, the blade 2 of the trimmer head 10 is a curved arc structure, and the blade edge at the upper end is arc-shaped correspondingly, therefore, on the premise of ensuring safety, compared with the existing straight eyebrow trimming blade, the blade 2 can be made very small and not easily inserted into the skin; combined with the inclined setting of the blade 2 relative to the axis L of the trimmer head body 1, the pen-shaped eyebrow trimmer can be operated like a pen, by placing the upper end of the blade 2 on the upper end face of the trimmer head body 1, the trimmer head can move perpendicular to the skin or inclined at a certain angle with the direction perpendicular to the skin when shaving, and the cutting edge direction of the blade 2 is inclined to the axis of the trimmer head 10 to form an inclined cutting angle to ensure the sharpness of cutting. Holding the pen-shaped eyebrow trimmer like a pen can effectively cut off the eyebrows, improve the flexibility and controllability of eyebrow trimming, and facilitate the control of the movement, direction and shaving amount of the eyebrow trimming, the blade 2 with arc-shaped structure can effectively control the shaving of concave and convex parts, so as to accurately trim and shape eyebrows.

Moreover, for individuals who trim their own eyebrows, looking in the mirror and holding the pen-shaped eyebrow trimmer to obtain a better vision and flexibly use to effectively trim their eyebrows, which has the advantages of convenient operation and high shaving safety.

In order to shave with the concave surface of the blade 2 facing forward of the move, and the concave surface of the blade 2 is disposed obliquely downward, so that the shaving position of the blade 2 can be better controlled.

For eyebrow trimming, in order to better control the shaving accuracy, the width E of the upper part of the blade 2 meets 2 mm<E≤10 mm, the width D corresponding to the width direction of the upper end of the trimmer head body 1 and the blade 2 meets 2 mm≤D≤15 mm, preferably 3 mm≤E≤6 mm, 4 mm≤D≤8 mm.

In order for the blade 2 to have a good curvature for cutting, the cross-section of the blade 2 is a circular arc structure, and the radius R of the corresponding circle meets 1.5 mm≤R≤10 mm.

Certainly, in addition to trimming eyebrows, this eyebrow trimmer can also be used to trim body hair in armpits and other parts. Accordingly, the width E of the upper part of the blade 2 and the width D of the upper end of the trimmer head body 1 can be made larger adaptively.

Figure 4:
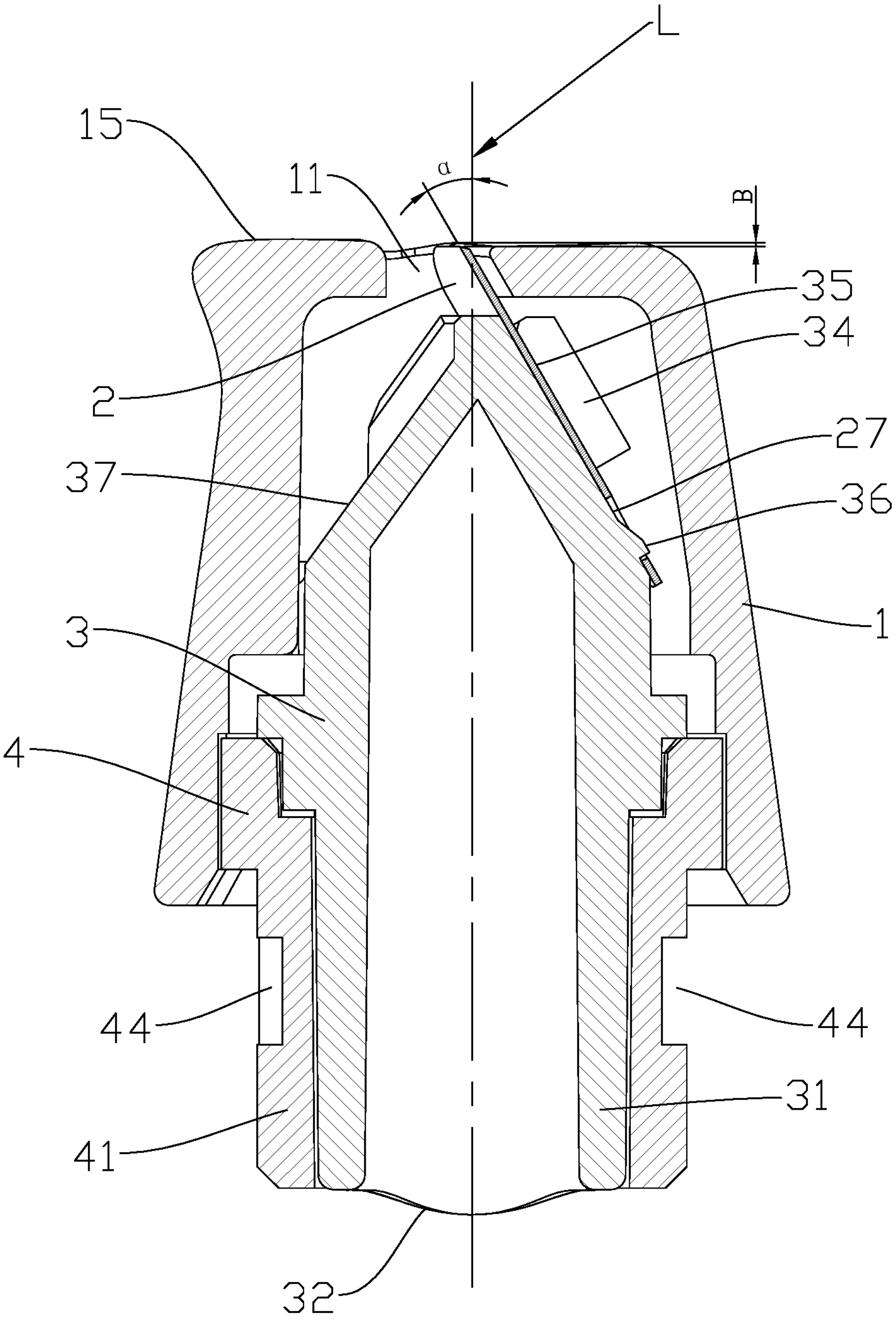
FIG. 4 is a sectional view of a trimmer head for pen-shaped eyebrow trimmer of the present invention along the direction I-I in FIG. 3 when a blade thereof is retracted.

In the embodiment shown in FIG. 4, in order to ensure the sharpness of shaving when holding the pen, the inclined angle α between the blade 2 and the axis L of the trimmer head body 1 meets 10°≤α≤80°, and in order to better ensure the sharpness of shaving when the pen-shaped eyebrow trimmer is inclined at a certain angle to the direction perpendicular to the skin, the inclined angle α between the blade 2 and the axis L of the trimmer head body 1 meets 20°≤α≤50°.

Figure 5:
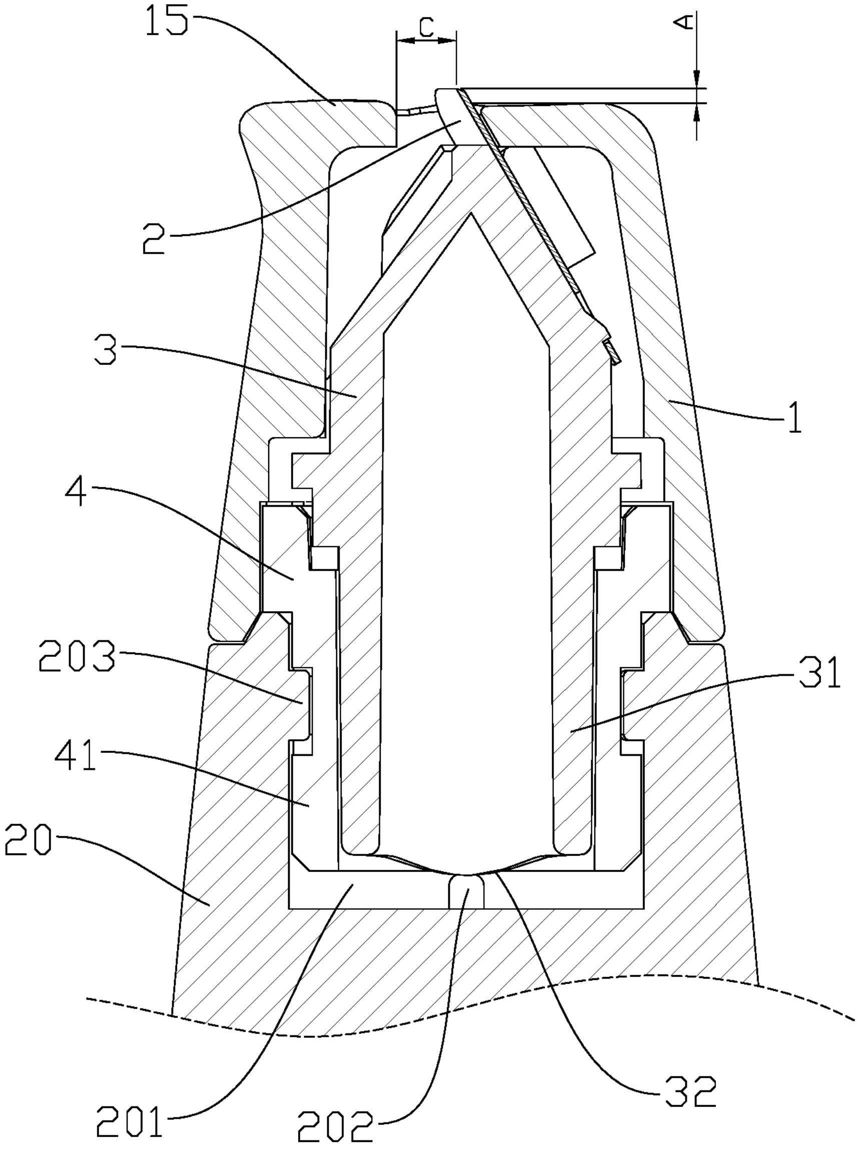
FIG. 5 is a sectional view of a trimmer head for pen-shaped eyebrow trimmer along the direction I-I in FIG. 3 when a blade thereof is extended.
Figure 6:
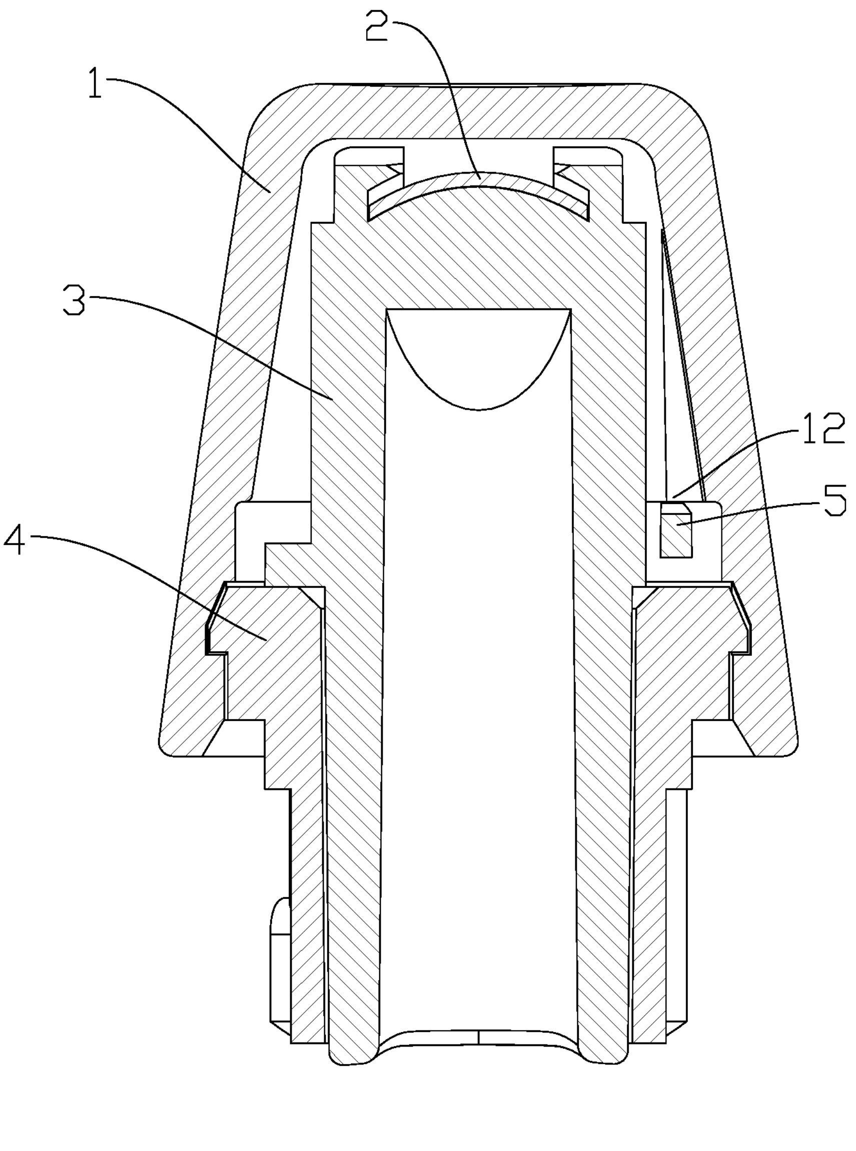
FIG. 6 is a sectional view of a trimmer head for pen-shaped eyebrow trimmer of the present invention along the direction II-II in FIG. 3.
Figure 7:
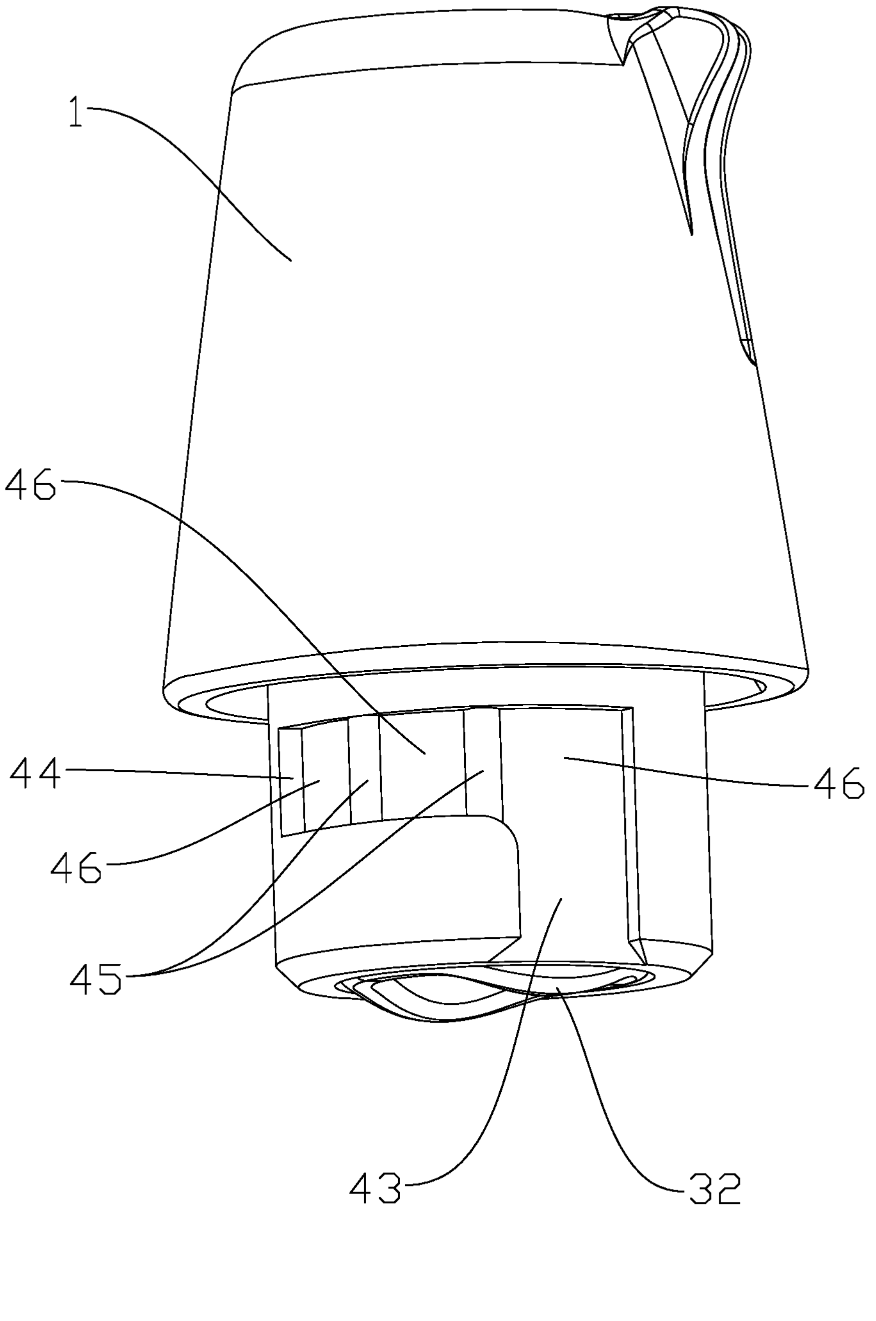
FIG. 7 is a structure diagram showing the structure of a trimmer head for pen-shaped eyebrow trimmer.

In the embodiment shown in FIG. 5, in order to better ensure safety while ensuring the shaving performance of blade 2 during shaving, the height A of the blade 2 extending above the upper end face of the trimmer head body 1 meets 0<A≤0.5 mm.

The blade 2 extends above the upper end face of the trimmer head body 1, and the structural mode of fixing the blade 2 on the trimmer head body 1 can be adopted, such as the blade 2 and the trimmer head body 1 being integrally injection molded and fixed. When it is not in use, the blade 2 is protected by covering the pen cap on the trimmer head 10 to prevent scraping the exposed blade in life.

In the embodiment shown in FIGS. 2 to 7, as another embodiment in which the blade 2 extends above the upper end face of the trimmer head body 1, the blade 2 is disposed in the trimmer head body 1, the upper end face of the trimmer head body 1 is provided with a blade outlet 11, a driving switch device which can drive the upper end of the blade 2 to extend from the blade outlet 11 above the upper end face of the trimmer head body 1 and fix the blade 2 can be disposed between the trimmer head 10 and the handle 20. When it is not in use, the blade 2 is hidden under the upper end face of the trimmer head body 1, which plays a protective role, and no additional pen cap is required for protection, as shown in FIG. 4, the height B of the blade 2 retracting below the upper end face of the trimmer head body 1 meets 0<B≤0.3 mm; when it needs to be used, the upper end of the blade 2 is raised above the upper end face of the trimmer head body 1 by the driving switch device, and the blade 2 is fixed for effective shaving. It has the advantages of simple structure and convenient use, and can avoid the defect that the blade 2 cannot be protected due to the loss of the cap.

In order to improve safety, the upper end face of the trimmer head body 1 forms the blade outlet 11, and a side wall 14 corresponding to the convex surface of the blade 2 is an arc structure corresponding to the convex surface of the blade 2, the convex surface of the blade 2 is disposed close to the side wall 14, it can prevent the skin from being squeezed between the blade 2 and the side wall 14 during shaving, and can also play a protective role when the blade 2 retracts under the upper end face of the trimmer head body 1.

The trimmer head body 1 is provided therein with a blade rack 3 that can move up and down in it, the blade 2 is fixed on the blade rack 3 and moves upward with the blade rack 3 so that the upper end of the blade 2 extends above the upper end face of the trimmer head body 1, and retracts below the upper end face of the trimmer head body 1 with the blade rack 3 moving downward, the lower part of the trimmer head body 1 is provided with a connector 4 that can prevent the blade rack 3 from falling out of the trimmer head body 1, the blade rack 3 is slidably connected up and down on the connector 4, and an elastic member 5 which can elastically pressing the blade rack 3 downward when the blade rack 3 is raised upward is provided between the blade rack 3 and the trimmer head body 1, the connector 4 is provided with a connecting part 41 located below the trimmer head body 1 and used for connecting with a handle 20, the connector 4 is provided with a through-hole 42 that penetrates up and down, the blade rack 3 is provided with a pressing shaft 31 inserted into the through-hole 42, a lifting device is disposed between the trimmer head 10 and the handle 20 to push up the pressing shaft 31 so that the upper end of the blade 2 extends above the trimmer head body 1, and the structure is simple. The elastic member 5 can prevent the blade 2 from extending from the blade outlet 11 autonomously, and can cooperate with the lifting device to fix the blade rack 3 after the lifting device lifts the blade rack 3, which is elastically limited from the top by the elastic member 5, since the force on the black rack 3 is downward during shaving, the lifting device supports the blade rack 3 from below to ensure the stability of the blade rack 3, it only needs to set the height at which the lifting device lifts the blade rack 3, the structure is simple and reduces the matching accuracy between the blade rack 3 and the trimmer head body 1 required to define the position when the blade rack 3 is raised.

The elastic member 5 is an elastic arm with one end fixed on the blade rack 3 and the other end suspended, the trimmer head body 1 is provided with a limiting boss 12 located above the elastic member 5 for limiting the upward lifting of the elastic member 5, preferably, the elastic member 5 and the blade rack 3 are integrally formed, with a simple structure and convenient assembly.

Figure 10:
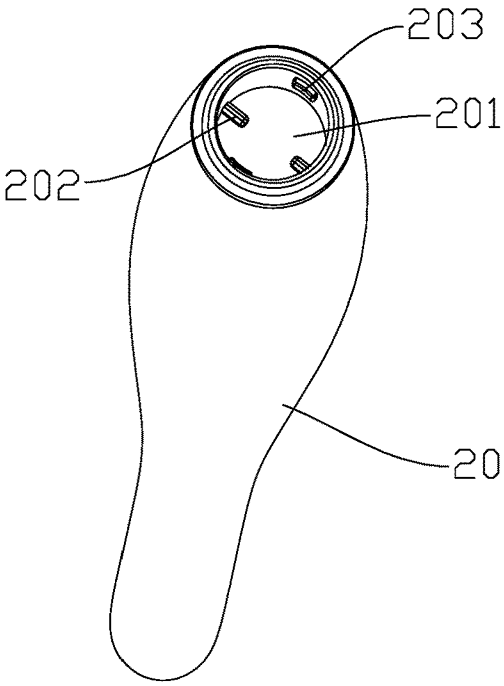
FIG. 10 is a structure diagram showing the structure of a handle.
Figure 11:
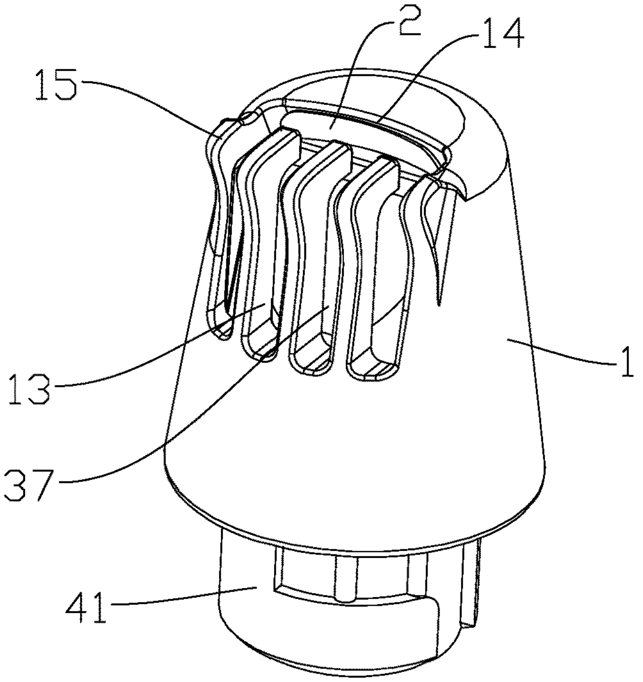
FIG. 11 is a structure diagram showing the structure of an embodiment of a trimmer head for pen-shaped eyebrow trimmer of the present invention.

As shown in FIG. 10, the upper end of the handle 20 is provided with an assembly groove 201 that is concave downward and matched with the connecting part 41, a lifting boss 202 is disposed in the assembly groove 201 and a buckle 203 is disposed on the side wall of the assembly groove 201.

The connector 4 is clamped and fixed on the trimmer head body 1, the connecting part 41 is a cylindrical structure so as to be able to rotate in the assembly groove 201, the pressing shaft 31 is provided with a convex lug 32 that protrudes downward below the connecting part 41, the convex lug 32 is disposed away from the central axis of the connecting part 41, there is a smooth transition between the convex lug 32 and the lower end face of the pressing shaft 31, and the blade rack 3 is connected to the connector 4 and rotates as the connector 4 rotates, when the blade rack 3 rotates, the lifting boss 202 can interfere with the convex lug 32 and lift the convex lug 32 upward, and the convex lug 32 and the lifting boss 202 constitute a lifting device with a simple structure, after the trimmer head 10 is installed on the handle 20, the trimmer head body 1 is rotated to drive the connector 4 and the blade rack 3 to rotate together, since the blade rack 3 can slide up and down on the connector 4, during the rotation process, when the convex lug 32 hits the lifting boss 202, it is lifted by the lifting boss 202, so that the upper end of the blade 2 extends above the trimmer head body 1, as shown in FIG. 5.

The outer side of the connecting part 41 is provided with a chute 43 which is concave from bottom to top and it can slide the buckle 203 into it, the outer side of the connecting part 41 is provided with a slot 44 that is concave from the side along its circumferential direction, one end of the slot 44 is communicated with the upper end of the chute 43 and can be used for the buckle 203 to slide in from the chute 43 so as to restrict the connection part 41 from being disengaged from the assembly groove 201 upward, and the slot 44 and the chute 43 form an L-shaped structure, the connecting part 41 is provided with gear bars 45 protruding in the slot 44 along the circumferential direction and used to prevent the buckle 203 from sliding in the slot 44, there are chamfers between the top and two sides of the gear bars 45 so that the buckle 203 can slide over the gear bar 45 under the action of an external force, and the gear bars 45 divide the slot 44 into three gear spaces 46 matched with the buckle 203.

One of the gear spaces 46 is communicated with the chute 43, so that when the trimmer head 10 is installed on the handle 20, the chute 43 and the buckle 203 are matched for the connecting part 41 to be inserted into the assembly groove 201, the buckle 203 slides directly into the gear space 46, and the trimmer head 10 is rotated so that the buckle 203 slides over the gear bar 45 and is in a gear space 46 in the middle, then the trimmer head 10 is installed and fixed on the handle 20, and the position between the lifting boss 202 and the convex lug 32 is staggered at this time; when the eyebrows need to be trimmed, the trimmer head 10 is rotated so that the buckle 203 slides over another gear bar 45 and is in the third gear space 46, the position between the lifting boss 202 and the convex lug 32 is opposite up and down, and during the rotation process, the convex lug 32 is pushed up by the lifting boss 202 so that the upper end of the blade 2 extends above the trimmer head body 1. When the trimmer head 10 is rotated in the opposite direction, the blade 2 is retracted into the trimmer head body 1, and the trimmer head 10 can be removed from the handle 20 when the trimmer head 10 is rotated continuously. The disassembly structure is simple, and the blade 2 lifting is convenient.

The driving switch device between the trimmer head 10 and the handle 20 is composed of the above blade rack 3, the elastic member 5, the connector 4, the assembly groove 201 of the handle 20, the lifting boss 202 and the buckle 203.

In the embodiment shown in FIGS. 2 to 5, the blade rack 3 is provided with an arc-shaped back part 33 for the blade 2 to abut against, the blade 2 is in a T shape from up to down, and the arc-shaped back part 33 is provided with side wings 34 extending relatively from the left and right sides of tongue bases, and a mounting groove 35 for inserting the T-shaped lower part of the blade 2 is formed between the left and right side wings 34 and the arc-shaped back part 33, the arc-shaped back part 33 is provided with a clamping boss 36 located below the side wings 34, and the side of the clamping boss 36 close to the mounting groove 35 is provided with a chamfer for the blade 2 to slide over the clamping boss 36, the blade 2 is provided with a clamping hole 27 for clamping with the clamping boss 36, and when the T-shaped upper part of the blade 2 is clamped on the upper ends of the left and right side wings 34, the clamping hole 27 is clamped on the clamping boss 36, the structure is simple, and the assembly is convenient. The blade 2 can be punched to the T-shaped plate by a metal sheet, and the clamping hole 27 can be punched out at the same time, and then the blade can be bent into an arc, finally, after the blade 2 is tilted at a certain angle, the upper end of the blade 2 is cut flat, and the cutting edge is processed. Then insert the formed blade 2 into the mounting groove 35 from top to bottom, so that the clamping hole 27 is clamped on the clamping boss 36, and the two stages of the blade 2 are clamped on the side wings 34.

In order to facilitate the hair falling into the trimmer head body 1 to fall out, the side of the trimmer head body 1 corresponding to the concave surface of the blade 2 is provided with at least a hair discharge port 13 for the hair falling into the trimmer head body 1 to fall out, the blade rack 3 is provided with a hair discharge inclined plane 37 inclined to the hair discharge port 13 from top to bottom, the upper end of the hair discharge inclined plane 37 is located below the edge of the blade 2, and the lower end is located above the bottom end of the hair discharge port 13.

In the embodiment shown in FIGS. 2 to 5 and FIG. 11, comb teeth 15 are disposed on the side of the trimmer head body 1 corresponding to the concave surface of the blade 2, so as to facilitate hair guiding, and at the same time, the comb teeth 15 are facing the blade 2, which can also play the role of orientation indication, during eyebrow trimming, since the blade is hidden between the skin and the trimmer head body 1, the direction of the blade 2 can be known through the comb teeth 15, which can effectively trim. The hair discharge port 13 is formed between two adjacent comb teeth 15 for the hair falling into the trimmer head body 1 to fall out.

In order to prevent the skin from being caught between the comb teeth 15 and being cut by the blade 2, the distance C between the comb teeth 15 facing the blade 2 and the blade 2 is between 0.2 mm and 3.0 mm, preferably between 0.8 mm and 1.5 mm.

Figure 12:
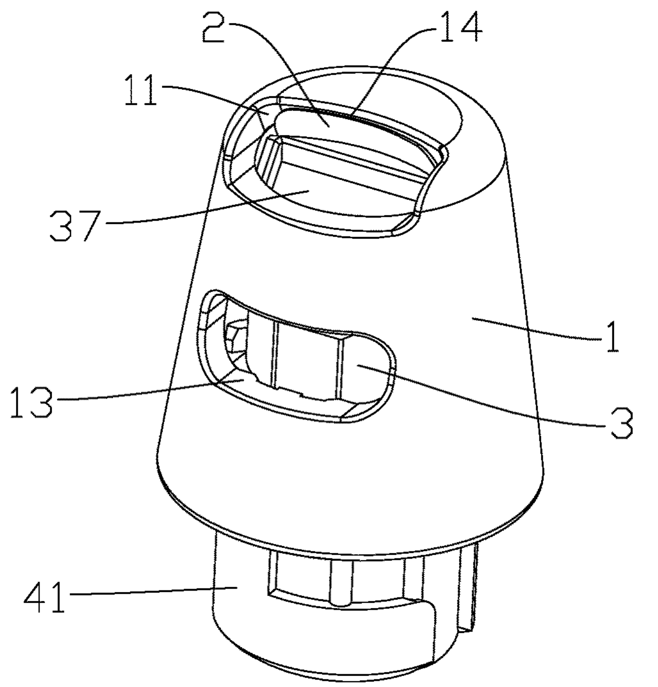
FIG. 12 is a structure diagram showing the structure of the second embodiment of a trimmer head for pen-shaped eyebrow trimmer of the present invention.

As shown in FIG. 12, as another embodiment of the orientation indication of the hair discharge hole and the blade 2, the trimmer head body 1 is provided with a notch on the side corresponding to the concave surface of the blade 2, which can be used for hair discharge and orientation indication of the blade 2, and the independent hair discharge port 13 is additionally provided below the notch.

Figure 13:
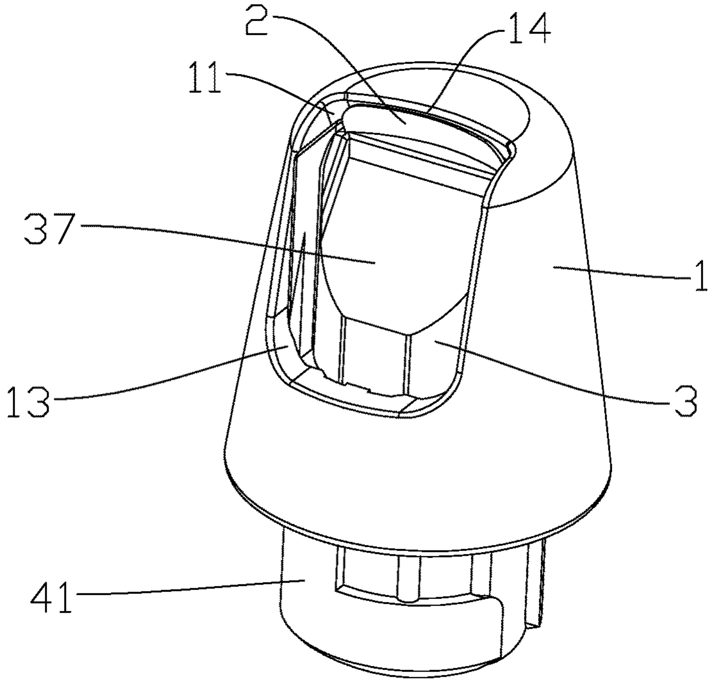
FIG. 13 is a structure diagram showing the structure of the third embodiment of a trimmer head for pen-shaped eyebrow trimmer of the present invention.

As shown in FIG. 13, as the third embodiment of the orientation indication of the hair discharge hole and the blade 2, the trimmer head body 1 is provided with a long notch from top to bottom on the side corresponding to the concave surface of the blade 2, which is also used as an orientation indication for the hair discharge port 13 and the blade 2.

The blade edge comprises an arc-shaped main cutting edge 24 at the top, the cutting edge line of the main cutting edge 24 is arc-shaped and perpendicular to the axis L of the trimmer head body 1 or substantially perpendicular to the axis L of the trimmer head body 1. During shaving, when the trimmer head 10 moves perpendicular to the skin or moves substantially perpendicular to the skin, the arc-shaped cutting edge of the main cutting edge 24 is substantially close to the skin; or when the trimmer head 10 is inclined at a certain angle perpendicular to the direction of the skin for shaving, the arc-shaped cutting edge of the main cutting edge 24 can also be attached to the skin in the middle, the two ends will only be raised by a small height and can also touch the skin according to the floating of the skin when shaving, so as to avoid injuring the skin with only a small tip of the main cutting edge 24 touching the skin.

Figure 8:
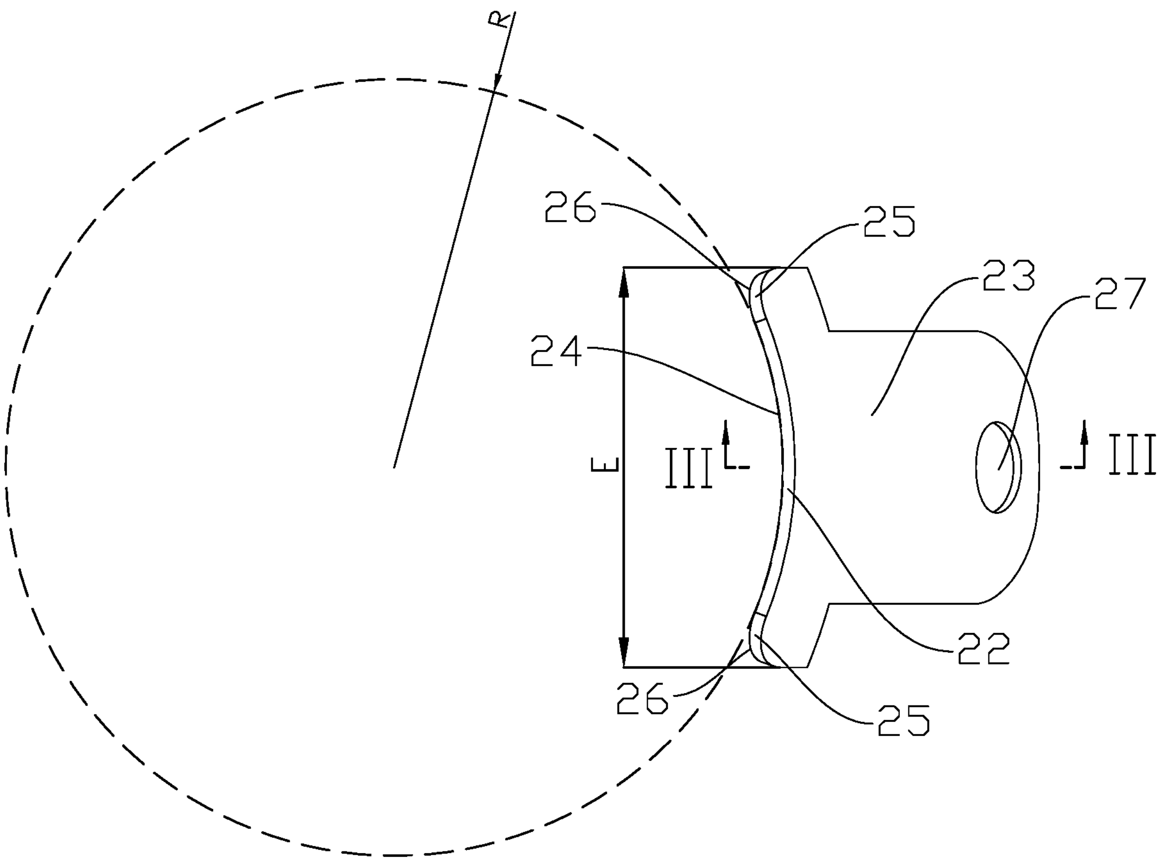
FIG. 8 is a top view of an embodiment of a blade.
Figure 9:
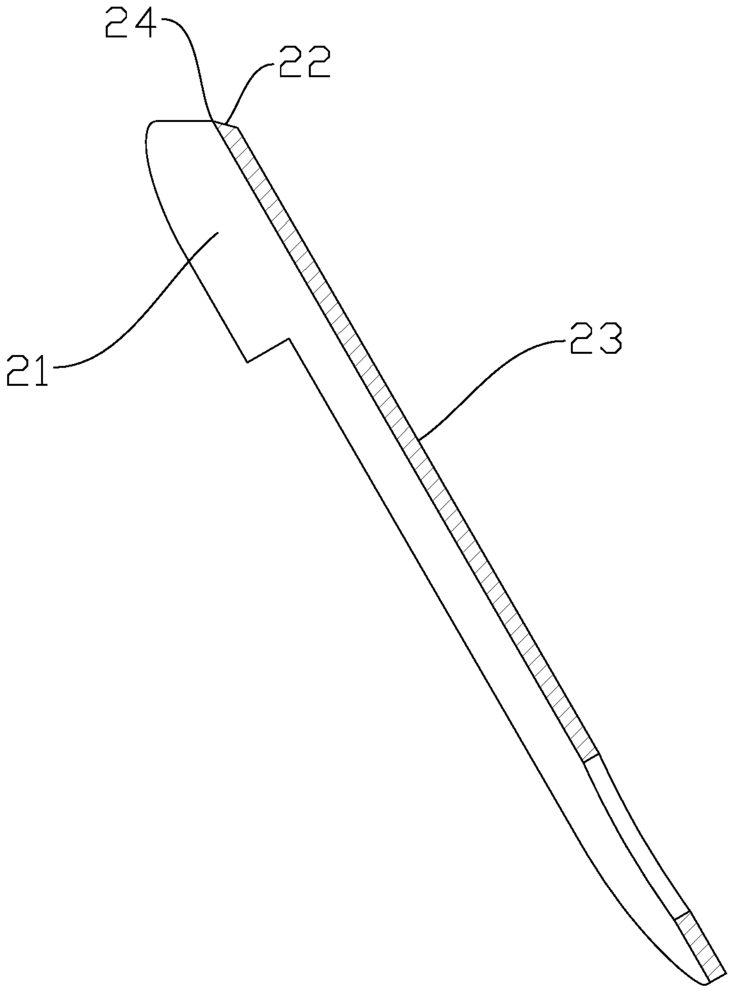
FIG. 9 is a sectional view of an embodiment of a blade along the direction III-III in FIG. 8.

As shown in FIGS. 8 and 9, as an embodiment of the blade 2, the blade 2 comprises a concave surface 21 and a convex surface 23 forming an arc-shaped structure, and an upper end face 22 connecting the concave surface 21 and the convex surface 23 from the upper end, the concave surface 21 and the upper end face 22 are disposed at an acute angle and intersect to form the main cutting edge 24. The arc formed by the intersection of the concave surface 21 and the upper end face 22 is the cutting edge line of the main cutting edge 24. The blade 2 is respectively provided with rounded corners 25 between the upper end face 22 and the left and right sides, the angles between the arc surfaces formed by the rounded corners 25 and the concave surface 21 are acute angles, the arc surfaces formed by the rounded corners 25 intersect with the concave surface 21 to form auxiliary cutting edges 26, so as to improve the multi-directional shaving effect of the trimmer head.

As shown in FIG. 9, the arc formed by the intersection of the convex surface 23 and the upper end face 22 is lower than the arc formed by the intersection of the concave surface 21 and the upper end face 22, so that the main cutting edge 24 is inclined upward, thereby improving the sharpness of cutting.

Figure 14:
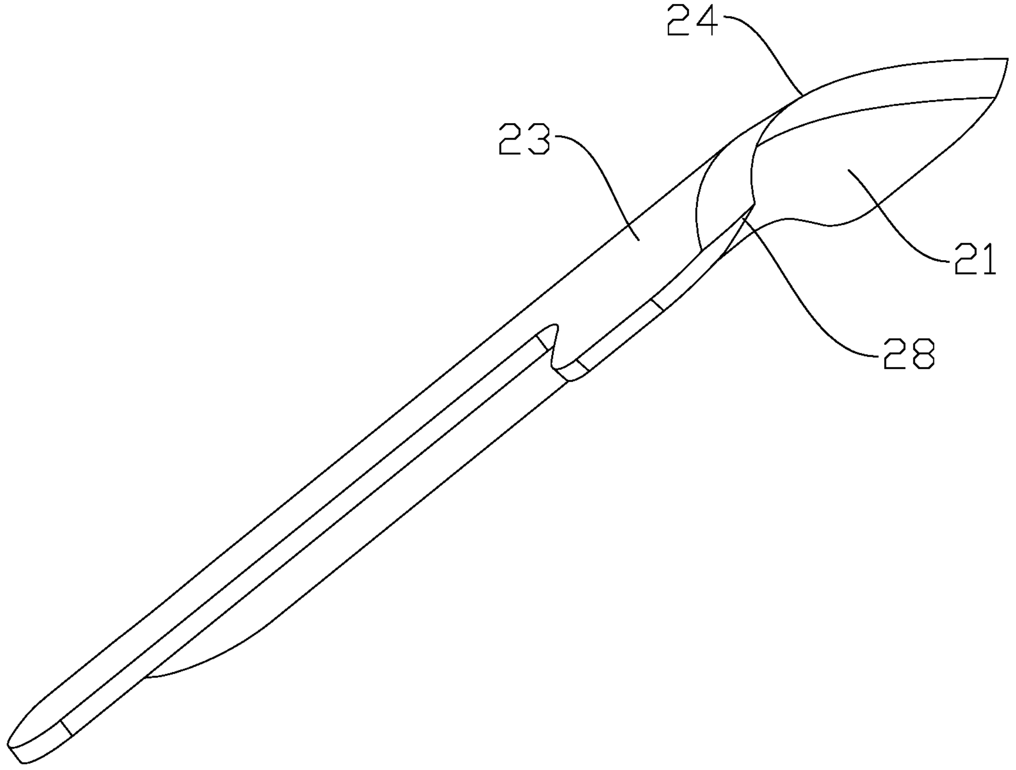
FIG. 14 is a structure diagram showing the structure of another embodiment of a blade.
Figure 15:
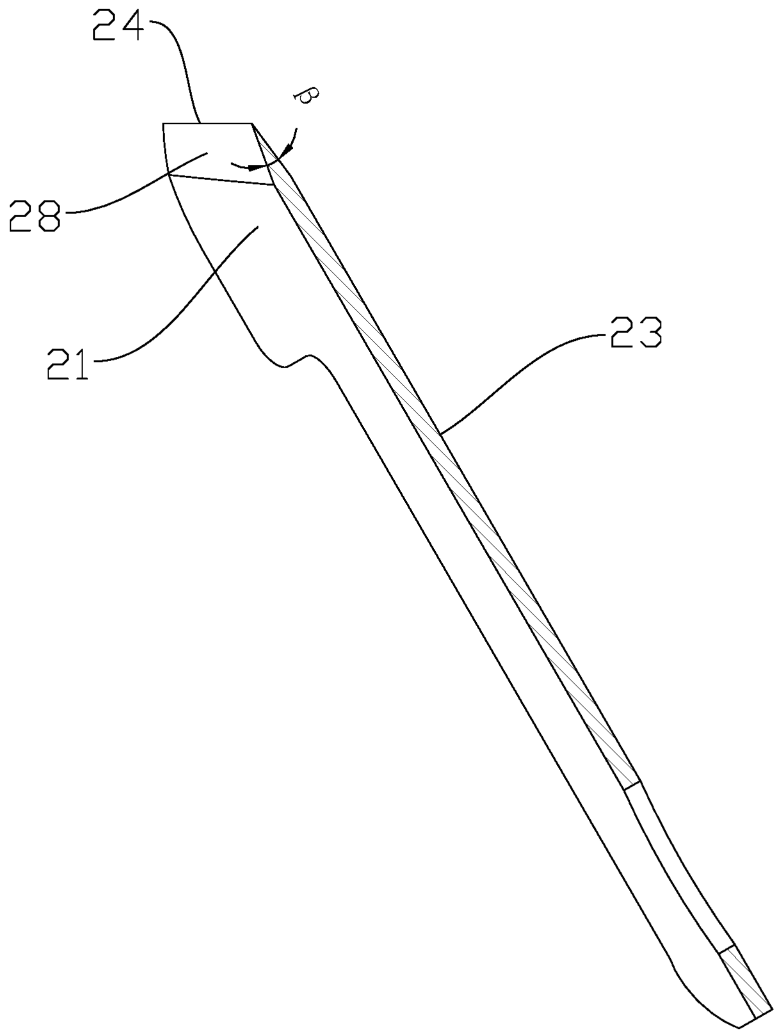
FIG. 15 is a cross-sectional view of a blade in FIG. 14.

As shown in FIGS. 14 and 15, as another embodiment of the blade 2, the blade 2 comprises a concave surface 21 and a convex surface 23 forming an arc-shaped structure, and a V-shaped tip 28 connecting the concave surface 21 and the convex surface 23 from the upper end, the V-shaped tip 28 forms the main cutting edge 24, and the angle β of the V-shaped sharp angle is between 5° and 30°, preferably between 15° and 20°.

The invention claimed is:

1. A trimmer head for pen-shaped eyebrow trimmer, comprising a cylindrical trimmer head body, the trimmer head body is provided with a blade which can shave body hair from an upper end, the blade is composed of an arc-shaped piece which has an arc-shaped structure in cross-section, and an arc-shaped blade edge is formed at the upper end of the arc-shaped piece, the blade is disposed obliquely relative to the axis of the trimmer head body and a concave surface of the blade is disposed obliquely downward.

2. The trimmer head for pen-shaped eyebrow trimmer according to claim 1, the blade edge comprises an arc-shaped main cutting edge at the top, the cutting edge line of the main cutting edge is arc-shaped and perpendicular to the axis of the trimmer head body or substantially perpendicular to the axis of the trimmer head body.

3. The trimmer head for pen-shaped eyebrow trimmer according to claim 2, the blade comprises the concave surface and a convex surface forming an arc-shaped structure, and an upper end face connecting the concave surface and the convex surface from the upper end, the concave surface and the upper end face are disposed at an acute angle and intersect to form the main cutting edge.

4. The trimmer head for pen-shaped eyebrow trimmer according to claim 3, the blade is respectively provided with rounded corners between the upper end face and the left and right sides, the angles between the arc surfaces formed by the rounded corner and the concave surface are acute angles, the arc surfaces formed by the rounded corners intersect with the concave surface to form auxiliary cutting edges.

5. The trimmer head for pen-shaped eyebrow trimmer according to claim 1, a width D corresponding to the width direction of the upper end of the trimmer head body and the blade meets 2 mm≤D≤15 mm, a width E of the upper part of the blade meets 2 mm<E≤10 mm.

6. The trimmer head for pen-shaped eyebrow trimmer according to claim 1, a cross-section of the blade is a circular arc structure, and a radius R of the corresponding circle meets 1.5 mm≤R≤10 mm.

7. The trimmer head for pen-shaped eyebrow trimmer according to claim 1, an inclined angle α between the blade and the axis of the trimmer head body meets 10°≤α≤80°.

8. The trimmer head for pen-shaped eyebrow trimmer according to claim 1, the blade is disposed in the trimmer head body, the upper end face of the trimmer head body is provided with a blade outlet for the upper end of the blade to extend upward, the trimmer head body is provided therein with a blade rack that can move up and down in it, the blade is fixed on the blade rack and moves upward with the blade rack so that the upper end of the blade(2) extends above the upper end face of the trimmer head body, and retracts below the upper end face of the trimmer head body with the blade rack moving downward.

9. The trimmer head for pen-shaped eyebrow trimmer according to claim 8, the lower part of the trimmer head body is provided with a connector that can prevent the blade rack from falling out of the trimmer head body, the blade rack is slidably connected up and down on the connector, and an elastic member which can elastically press the blade rack downward when the blade rack is raised upward is provided between the blade rack and the trimmer head body.

10. The trimmer head for pen-shaped eyebrow trimmer according to claim 9, the connector is provided with a connecting part located below the trimmer head body and used for connecting with a handle, the connector is provided with a through-hole that penetrates up and down, the blade rack is provided with a pressing shaft inserted into the through-hole, and the upper end of the blade is extended above the trimmer head body by pressing the pressing shaft upward.

11. The trimmer head for pen-shaped eyebrow trimmer according to claim 10, the connector is clamped and fixed on the trimmer head body, the connecting part is a cylindrical structure, the pressing shaft is provided with a convex lug that protrudes downward below the connecting part, the convex lug is disposed away from the central axis of the connecting part, there is a smooth transition between the convex lug and the lower end face of the pressing shaft, and the blade rack is connected to the connector and rotates as the connector rotates.

12. The trimmer head for pen-shaped eyebrow trimmer according to claim 11, the outer side of the connecting part is provided with a chute concave from bottom to top, and the outer side of the connecting part is provided with a slot that is concave from the side along its circumferential direction, one end of the slot is communicated with the upper end of the chute, and the slot and the chute form an L-shaped structure, the connecting part is provided with gear bars protruding in the slot along the circumferential direction, there are chamfers between the top and two sides of the gear bars, and the gear bars divide the slot into three gear spaces, one of the gear spaces communicates with the chute.

13. The trimmer head for pen-shaped eyebrow trimmer according to claim 9, the elastic member is an elastic arm with one end fixed on the blade rack and the other end suspended, the trimmer head body is provided with a limiting boss located above the elastic member for limiting the upward lifting of the elastic member.

14. The trimmer head for pen-shaped eyebrow trimmer according to claim 8, the blade rack is provided with an arc-shaped back part for the blade to abut against, the blade is in a T shape from up to down, and the arc-shaped back part is provided with side wings extending relatively from the left and right sides of tongue bases, and a mounting groove for inserting the T-shaped lower part of the blade is formed between the left and right side wings and the arc-shaped back part, the arc-shaped back part is provided with a clamping boss located below the side wings, and the side of the clamping boss close to the mounting groove is provided with a chamfer for the blade to slide over the clamping boss, the blade is provided with a clamping hole for clamping with the clamping boss, and when the T-shaped upper part of the blade is clamped on the upper ends of the left and right side wings, the clamping hole is clamped on the clamping boss.

15. The trimmer head for pen-shaped eyebrow trimmer according to claim 8, the side of the trimmer head body corresponding to the concave surface of the blade is provided with at least a hair discharge port for the hair falling into the trimmer head body to fall out.

16. The trimmer head for pen-shaped eyebrow trimmer according to claim 15, the blade rack is provided with a hair discharge inclined plane inclined to the hair discharge port from top to bottom, the upper end of the hair discharge inclined plane is located below the edge of the blade, and the lower end is located above the bottom end of the hair discharge port.

17. The trimmer head for pen-shaped eyebrow trimmer according to claim 8, the upper end face of the trimmer head body forms a blade outlet, and a side wall corresponding to the convex surface of the blade is an arc structure corresponding to the convex surface of the blade.

18. The trimmer head for pen-shaped eyebrow trimmer according to claim 1, the side of the trimmer head body corresponding to the concave surface of the blade is provided with comb teeth.

19. The trimmer head for pen-shaped eyebrow trimmer according to claim 18, the distance C between the comb teeth facing the blade and the blade is between 0.2 mm and 3.0 mm.

* * * * *